Patented Mar. 25, 1952

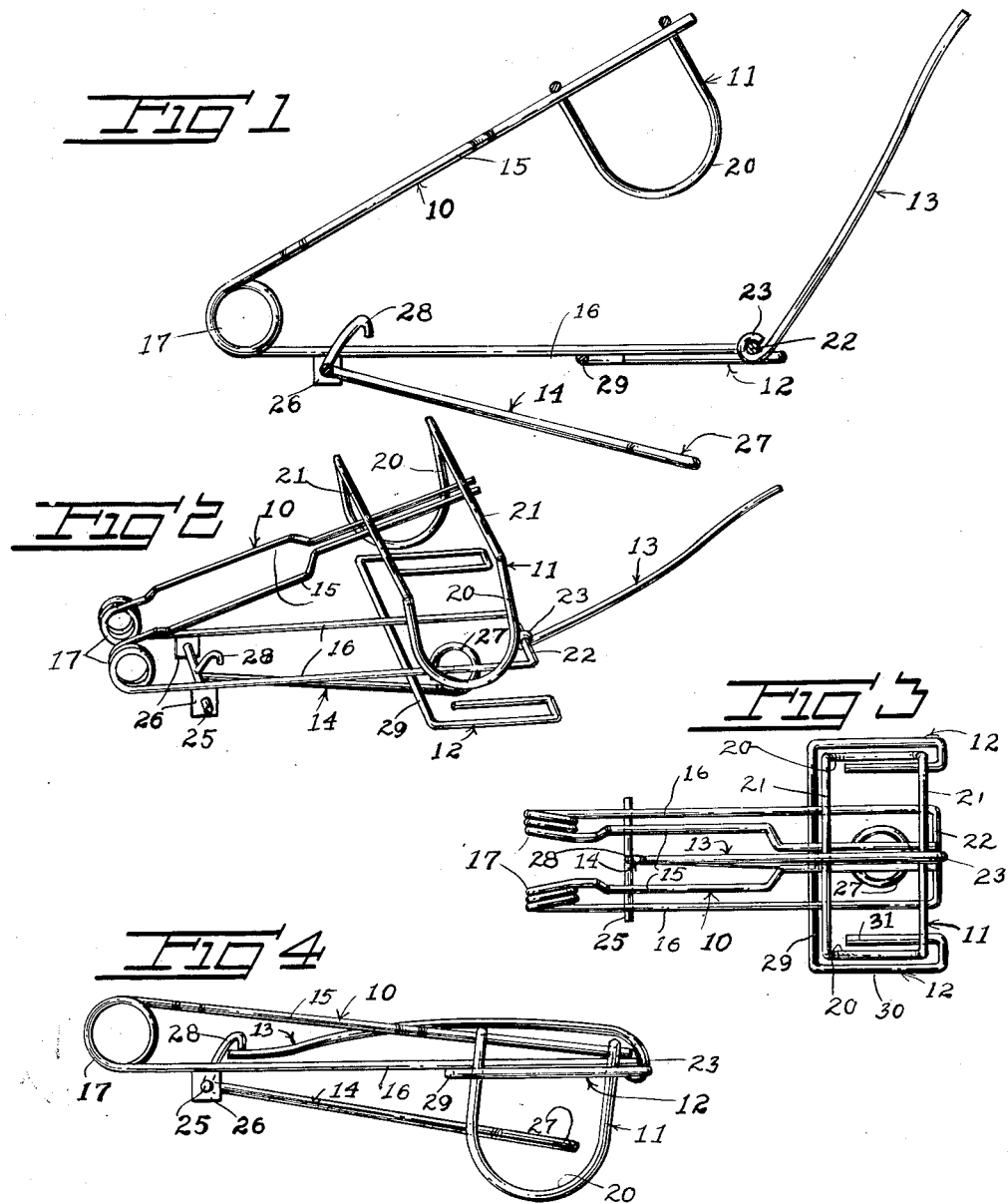

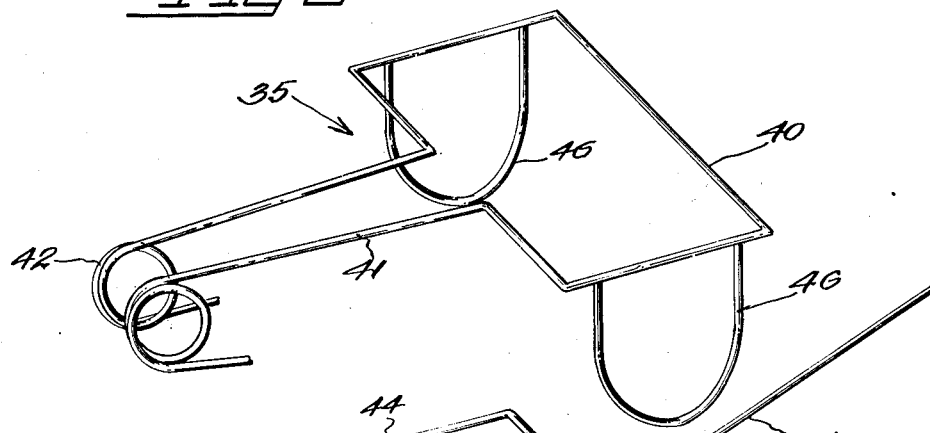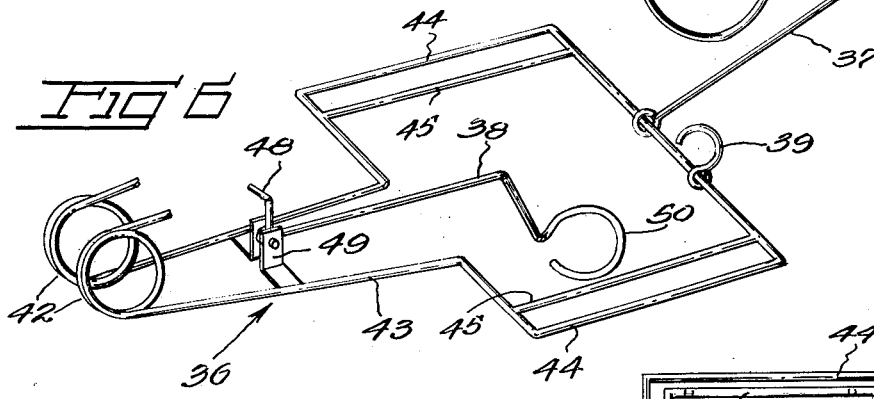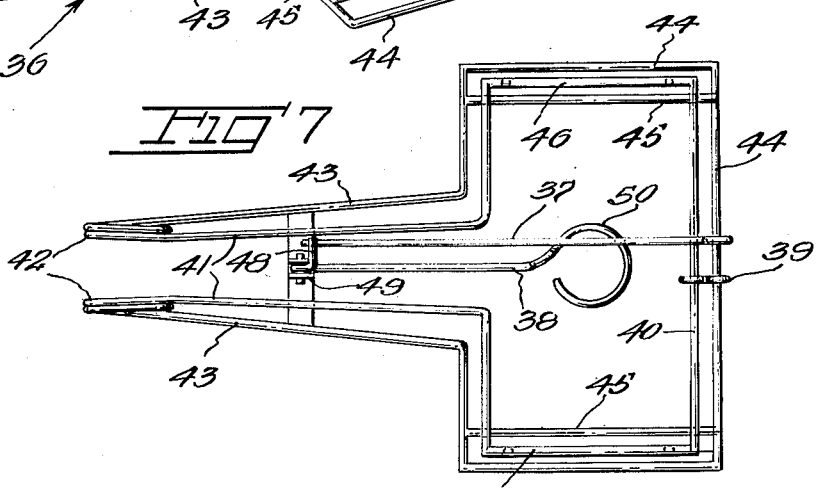

2,590,489

UNITED STATES PATENT OFFICE 2,590,489

MOLE TRAP

Edwand V. Bailey, Santa Paula, Calif.

Application August 13, 1946, Serial No. 690,185

1 Claim. (Cl. 43—86)

This invention is a device for the purpose of catching one of the very common and destructive insectivora, the mole. It is adapted to be set in a trench dug across the mole runway and so placed that a loop of the trap is placed in front of either entrance to the mole runway. Both trap and trench is then covered with dirt. The mole can enter the trap from either runway direction, when, upon entering through the loop, the mole encounters the trigger, which is between the two loops. In so doing, the mole tries to burrow under the trigger, which causes the trigger to be forced upward, thereby springing the trap which causes the loop to be snapped upward. As the loop is between the prongs of the fork and the mole is approximately half-way through the loop, this results in the mole being pinned against the bottom of the fork and securely caught.

An object of this invention is to provide a simple and sure means of trapping the destructive mole in gardens and on farms. With this trap, there is no time or effort wasted as it takes but a short time to set. It is then left alone until it is sprung. It is then a simple matter to pick up the trap, remove the mole and reset the trap if there is evidence of another mole.

This invention is illustrated in the drawings, wherein like numerals denote the same details in the several views.

Figure 1 is a vertical section taken along a central, longitudinal plane of the trap when sprung;

Figure 2 is a perspective view of the trap, when sprung;

Figure 3 is a top plan view of the trap set;

Figure 4 is a side elevation with the trap set.

This mole trap consists of five main parts namely a V-spring member 10, a loop member 11, a fork member 12, a latch member 13 and a trigger member 14.

The V-spring member is made of spring wire bent double to form two shanks 15 and 16 with helical coils 17 at the apex forming the actual spring portion, which is about 1½ inches across, the two outer ends of which continuing perpendicularly to the coil axis, form the bottom shank 16. The two inner wire portions of the coils 17 also continuing perpendicularly to the coil axis, form the upper shank 15. The shanks 15 and 16, each thus consists of two spaced juxtaposed bars or strands of wire, which shanks form an angle with each other, when free, of about 30°, see Figure 1 and 2.

To the free end of shank 15 is firmly secured by metal welding or otherwise, the loop member 11 which is made by bending a metal rod in the shape of an oblong loop with closed rounded ends 20 and parallel sides 21 about 2½ inches apart. These sides are secured across the shank 15 and the rounded ends 20 turned straight down to form a pair of loops spaced apart in a direction transversely of the shank.

The lower shank 16 with the wire strands cross connected as at 22, forms a hinge pin for the latch member 13. The latter consists of a straight metal rod, about 5½ inches long, with its inner end 23 curled around the hinge pin 22 to swing easily thereon.

The trigger 14 is T-shaped, having a cross rod 25 welded at its inner end to provide a trunnion at each side thereof, hinged in a pair of eyelets 26 beneath the shank 16 adjacent the helical spring 17 to permit oscillation in the vertical plane of the trigger 14, which at its free end is looped to provide a flattened trigger pull 27. The trigger is about 7½ inches long, over all, so that the trigger pull is located between the two strands of the lower shanks 16 and midway between the two loops 20. On the upper side of the trunnion rod 25 is provided a sideways turned hook 28 adapted to engage with the free end of the latch member 13, when the trap is set.

The metal fork member 12 has rectangular shape with a straight central portion 29 about 4 inches long which extends transversely of and is welded to the bottom side of the lower shank 16 of the V-spring 10. Each end of the fork member 12 is bent back, parallel to said shank to provide double prongs 30, 31 with a space about ½ inch between them and forms guide frames through each of which a loop 20 is adapted to extend.

This fork member 12 is so positioned in relation to the loop member 11, that, when the trap is set, the loops 20 pass through between the prongs 30, 31 of the fork member 12, and project below them.

The following specific features and advantages of my trap are here mentioned.

The trap is made to set under ground and is adjustable to the position of the mole runway.

The trigger is placed across the runway so that the mole must lift it up to pass; while, in other traps the triggers are on top of the ground and it is very easy for the mole to pass through them without moving the triggers enough to spring the trap.

In my trap, the top is open and may be covered with earth. This leaves no part of the trap exposed to the mole except the trigger which is covered with earth.

By setting my trap in the ground, the loops may be made much shorter and narrower. This eliminates the chances of the mole slipping thru when the trap is sprung.

Other traps are made to sit on top of the ground and their scope is limited to moles that work very close to the top of the soil; whereas, my trap may be set at any desired depth.

The sizes herein given are only approximate and may of course be modified to suit conditions and the size of the animal to be caught.

The operation of the trap is the following. A trench is first dug across the runway of the mole deep enough so that both loops 20 can enter the runway, when the trap is placed across the same. The spring shank 15 is then pushed down against spring shank 16 and the latch member 13 laid across the loop member 11 to engage the trigger hook 28. Both loops 20 will then hang down in the trench 32 across the mole path 33. Lastly the trap and runway are then covered with dirt.

If now the mole comes along the runway in either direction, entering thru one of the loops 20, and while his body is still in the loop, he will attempt to pass under the trigger pull 27, which is very sensitive and on the slightest touch will pull the trigger 14. The mole will then be caught between the loop 20 and the fork prongs 30, 31.

The simplified form of the trap consists of four main parts namely: a V-spring with top jaw 35 and bottom jaw 36 forming a unit, a latch member 37, a trigger 38 and a safety catch 39.

It is to be understood that the invention as herein disclosed may be varied from the details described and shown without departure from the spirit of the subjoined claim.

I claim:

In a mole trap, a body formed of a length of wire to provide a lower part and an upper part, said lower part being formed of a medial portion of the wire which is bent at its center to provide a relatively short transversely disposed straight front end portion and rearwardly extending parallel straight arm portions, coil springs formed at the rear ends of said arm portions and merging into forwardly directed arm portions, constituting the upper part, the latter arm portions having rear end portions thereof extending parallel to, above and slightly inward from the adjacent portions of the first arm portions and their free end portions extending in parallel closely spaced relation to a point above the approximate center of the said transverse straight portion, a substantially U-shaped frame disposed crosswise of the first arm portions inwardly of the forward ends thereof, the leg portions of said frame being angularly bent inwardly and rearwardly to provide partially enclosed spaces at the opposite sides of said lower part, a second open frame disposed crosswise of the free end portions of the said upper part and having its ends made arcuate and down-turned to enter the said partially enclosed spaces whenever the upper part is depressed toward the lower part, a pair of transversely aligned ears depending from the first arm portions adjacent the said springs, a trigger member pivoted in said ears and extending forwardly beneath the center of the lower part, a trigger pull at the forward end of said trigger member, and a latch member pivoted on said transverse straight portion and extending rearwardly for engagement with said trigger member.

EDWARD V. BAILEY.

REFERENCES CITED

The following references are of record in the file of this patent:

UNITED STATES PATENTS

| Number | Name | Date |
|---|---|---|
| 157,973 | Richardson | Dec. 22, 1874 |
| 385,788 | Beversdorf | July 10, 1888 |
| 529,801 | Nash | Nov. 27, 1894 |
| 1,029,087 | Scott | June 11, 1912 |
| 1,481,222 | Odatey | Jan. 15, 1924 |